UNITED STATES PATENT OFFICE.

HUGHES L. SIEVER, OF ERIE, PENNSYLVANIA.

METHOD AND COMPOUND FOR WELDING STEEL AND OTHER METALS.

1,315,611.   Specification of Letters Patent.   Patented Sept. 9, 1919.

No Drawing.   Application filed March 5, 1919. Serial No. 280,789.

*To all whom it may concern:*

Be it known that I, HUGHES L. SIEVER, a citizen of the United States, residing at Erie, in the county of Erie and State of Pennsylvania, have invented certain new and useful Improvements in Methods and Compounds for Welding Steel and other Metals; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to methods and compounds for welding alloy steels, soft steel, special alloys and any metals or combination of metals having a melting point higher than that of the welding compound.

In carrying out my invention I place sufficient quantities of the compound between the cleaned surfaces of the metals to be welded together, and the whole is then brought to such temperature as will fuse the compound, and then removed from the source of heat and allowed to cool, thereby completing the weld.

In ordinary practice I preferably heat the articles to be welded to approximately 1850° F. I then place a sufficient amount of the welding material on the surfaces to be welded, the heat causing it to adhere thereto, and the surfaces are then placed together and the whole is heated to approximately from 2100° F. to 2300° F., which causes a complete fusion of the compound, then quickly remove the whole, and if desired submit it to a small amount of pressure until the solidification of the compound takes place, thereby producing a complete homogeneous fusion of the welding compound into the meeting surfaces of the metals joined, and forming a perfect welding thereof together.

In practising my invention I use a welding compound preferably compounded of:

| | |
|---|---|
| Ferrovanadium | 30 to 50% |
| Ferromanganese | 25 " 45% |
| Alloy steel | 1 " 20% |
| And a suitable borate flux | 5 " 30% | all of which materials I preferably pulverize to a uniform fineness that will pass through a forty mesh sieve. These materials then mixed are ready for use as hereinbefore described.

The essential ingredients of this compound are vanadium and manganese, and their use as ferrovanadium and ferromanganese is obviously a convenient way to utilize them for the purpose described; the combination therewith of chromium, tungsten or silicon, or either of them in my compound do not change the characteristics or action of the main ingredients of the compound.

It will be observed that there may be considerable variation in the proportions of the principal ingredients of my compound with substantially like results obtained therewith in operation, and the variation of the compound by the addition thereto of chromium, tungsten or silicon, such as are ordinarily found in alloy or high-speed steels in many cases, operate with good results, and the compound so found embodying as it does the essential ingredients of my compound is well within the scope of my invention.

In this case the proportions of the composition would substantially be:

| | |
|---|---|
| Vanadium | 10 to 20% |
| Manganese | 20 " 40% |
| Iron | 25 " 50% |
| Chromium | 05 " 5% |
| Tungsten | 05 " 8% |
| Silicon | 05 " 3% |
| And a suitable flux, for example, burnt borax | 5 to 25% |

This compound prepared and used as above described, will also give good results in the practice of my invention.

My invention can be successfully carried out by the use of any type of heating furnace capable of producing the necessary degree of heat, but I prefer to use a furnace in which an excessive oxidizing or reducing flame does not reach the materials being welded; therefore a furnace in which the flame is excluded from the heating chamber is the best adapted to the practice of my invention.

I am aware that other compositions for welding steel have been used with a greater or less degree of success, therefore I do not broadly claim the method of welding steels by the use of any welding compounds, but rather the improvement in welding compositions and the method of welding steel and other ferrous metals by means thereof.

Therefore what I claim as new and desire to secure by Letters Patent is:

1. A welding compound comprising ferrovanadium, ferromanganese, and a suitable flux, substantially as set forth.

2. A welding compound comprising vanadium, manganese, comminuted alloy steel, and a suitable flux, substantially as set forth.

3. A welding compound comprising a mixture of vanadium manganese, tungsten, comminuted alloy steel, and a suitable borate flux, substantially as set forth.

4. A welding compound comprising a mixture of ferrovanadium, ferromanganese, alloy steel, and a suitable borate flux, substantially as set forth.

5. A welding compound comprising a mixture of vanadium, manganese, iron, chromium, tungsten, silicon, and a borate flux, substantially as set forth.

6. A welding compound comprising a mixture of ferrovanadium 30 to 50%, ferromanganese 25 to 40%, alloy steel 1 to 20%, and a suitable borate flux 5 to 30%, substantially as set forth.

7. A welding compound comprising a mixture of vanadium 10 to 20%, manganese 20 to 40%, iron 25 to 50%, chromium 05 to 5%, tungsten 05 to 8%, silicon 05 to 3%, and a suitable flux, for example, burnt borax, 5 to 25%, substantially as set forth.

In testimony whereof I affix my signature.

HUGHES L. SIEVER.